US008656758B2

(12) United States Patent
Brown et al.

(10) Patent No.: US 8,656,758 B2
(45) Date of Patent: Feb. 25, 2014

(54) APPROACHES FOR DETECTING LEAKS IN A HARD-DISK DRIVE (HDD) COVER

(75) Inventors: Charles A Brown, San Jose, CA (US); Ryan Davis, Mountain View, CA (US)

(73) Assignee: HGST Netherlands B.V., Amsterdam (NL)

( * ) Notice: Subject to any disclaimer, the term of this patent is extended or adjusted under 35 U.S.C. 154(b) by 619 days.

(21) Appl. No.: 12/961,990

(22) Filed: Dec. 7, 2010

(65) Prior Publication Data

US 2012/0137751 A1    Jun. 7, 2012

(51) Int. Cl.
*G01M 3/04* (2006.01)
(52) U.S. Cl.
USPC .......................................................... 73/40.7
(58) Field of Classification Search
USPC .......................................................... 73/40.7
See application file for complete search history.

(56) References Cited

U.S. PATENT DOCUMENTS

| | | | |
|---|---|---|---|
| 6,646,821 B2 | 11/2003 | Bennett et al. | |
| 6,765,379 B1 | 7/2004 | Marshall et al. | |
| 6,819,517 B2 | 11/2004 | Fioravanti et al. | |
| 7,062,387 B1 | 6/2006 | Burns et al. | |
| 7,123,440 B2 * | 10/2006 | Albrecht et al. | 360/99.18 |
| 7,236,321 B1 | 6/2007 | Fukushima | |
| 7,398,590 B1 | 7/2008 | Mann et al. | |
| 7,434,987 B1 | 10/2008 | Gustafson et al. | |
| 2003/0179489 A1 * | 9/2003 | Bernett et al. | 360/97.01 |
| 2004/0000200 A1 * | 1/2004 | Ries et al. | 73/864.34 |
| 2006/0023339 A1 | 2/2006 | Fukuyama et al. | |
| 2007/0148524 A1 * | 6/2007 | Kuroki et al. | 429/35 |
| 2007/0154769 A1 * | 7/2007 | Kuroki et al. | 429/35 |
| 2007/0268621 A1 * | 11/2007 | Bernett et al. | 360/97.02 |
| 2008/0212237 A1 | 9/2008 | Uefune et al. | |
| 2009/0102131 A1 * | 4/2009 | Gunderson | 277/312 |
| 2010/0199748 A1 * | 8/2010 | Martino | 73/40.7 |

OTHER PUBLICATIONS

Melkote et al., "Modeling and control for self-servowriting in hard disk drives: a repetitive process approach" http://ieeexplore.ieee.org/stamp/stamp/.jsp?tp=&arnumber=1656514, printed Jul. 29, 2010.

* cited by examiner

*Primary Examiner* — Hezron E Williams
*Assistant Examiner* — Rodney T Frank
(74) *Attorney, Agent, or Firm* — Brokaw Patent Law PC; Christopher J. Brokaw

(57) ABSTRACT

Approaches for a testing apparatus for evaluating a cover of a hard-disk drive. The testing apparatus may detect whether the cover has a defect that prevents the cover from being sufficiently airtight. The testing apparatus includes a base structure that comprises a concave recess shaped to receive the cover to be tested. When the cover is disposed within the concave recess, the cover forms a first chamber in the concave recess between the cover and the base structure. The testing apparatus also includes a removable lid. When the removable lid covers the concave recess with the cover disposed therein, the removable lid forms a second chamber in the concave recess between the cover, the base structure, and the removable lid. The testing apparatus also includes a means for introducing helium gas to one of the chambers and a means for detecting how much helium gas leaks from that chamber.

20 Claims, 5 Drawing Sheets

Example Rubber Seals

APPROACHES FOR DETECTING LEAKS IN A HARD-DISK DRIVE (HDD) COVER

FIELD OF THE INVENTION

Embodiments of the invention relate to improved approaches for evaluating the protective cover of a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

In order to assist in the positioning of the read/write head, a HDD may undergo a self servo write process in which the HDD writes servo information onto the disk. When read back, servo information provides a continuous update on the location of the read/write head. A low density gas, such as helium, may be introduced into the interior of the HDD when the HDD performs a self servo write process to reduce excitation of the disk, actuator, and head.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

To prevent damage to the sensitive interior components of the HDD by the introduction of harmful airborne particles, the HDD is encased in a protective enclosure. The protective enclosure is designed to be airtight, with the exception of intentional openings in the enclosure that are protected by particle filters. A typical protective enclosure is formed using two components called a cover and a base. The cover and the base may be sealed with the assistance of a cover gasket.

A popular type of low cost cover gasket is cured with a short exposure to ultra violet (UV) light. Under some conditions, this can result in a surface morphology that allows the rapid diffusion of gas therethrough while nevertheless appearing to hold gas using a conventional pressure test. Currently, this condition is only detected when the HDD fails a key test after the self servo write process. While it is possible to measure gas leakage through the protective enclosure of the HDD after the HDD has been assembled, if the source of the leak is a defective cover, then many drives will have already been built before the problem is detected. In addition, large stocks of problematic covers may already be part of assembly plant stock.

SUMMARY OF THE INVENTION

Approaches are disclosed which enable the detection of manufacturing irregularities, such as a surface induced diffusive leak (or "SIDIL"), or other complications that could render a cover of a hard-disk drive (HDD) to be non-gas-tight. A testing apparatus according to certain embodiments may determine whether a cover is sufficiently gas-tight using testing conditions that provide effectively the same sealing forces and cover displacement boundary conditions as would be experienced by the cover after assembly in an actual disk drive. Moreover, the time required to complete a test of a cover using the testing apparatus of certain embodiments is significantly less than prior approaches. As a result, the cover testing apparatus of embodiments of the invention may detect very small leaks, such as SIDIL, in a cover of a HDD to a high degree of accuracy in less time than any prior approach.

In an embodiment, a base structure comprises a concave recess shaped to receive the cover to be tested. When the cover is disposed within the concave recess, the cover forms a first chamber in the concave recess between the cover and the base structure. A removable lid may be used to cover the concave recess. When the removable lid covers the concave recess with the cover disposed therein, the removable lid forms a second chamber in the concave recess between the cover, the base structure, and the removable lid. The testing apparatus includes means for introducing a low density gas, such as helium gas, to one of the first chamber and the second chamber. The testing apparatus also includes a mass spectrometer means for detecting an amount of the low density gas leaking from the chamber in which the low density gas was introduced.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for evaluating a cover of a hard-disk drive to determine whether the cover is sufficiently gas-tight are presented herein. In an embodiment, a testing apparatus may be used that allows for the sensitive detection of surface induced diffusive leaks (SIDIL) using a mass spectrometer based helium leak detector. The testing apparatus may provide the same or approximately the same sealing forces and cover displacement boundary conditions as would be experienced by the cover after assembly in a hard-disk drive.

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Hard-Disk Drives

Figure 1:
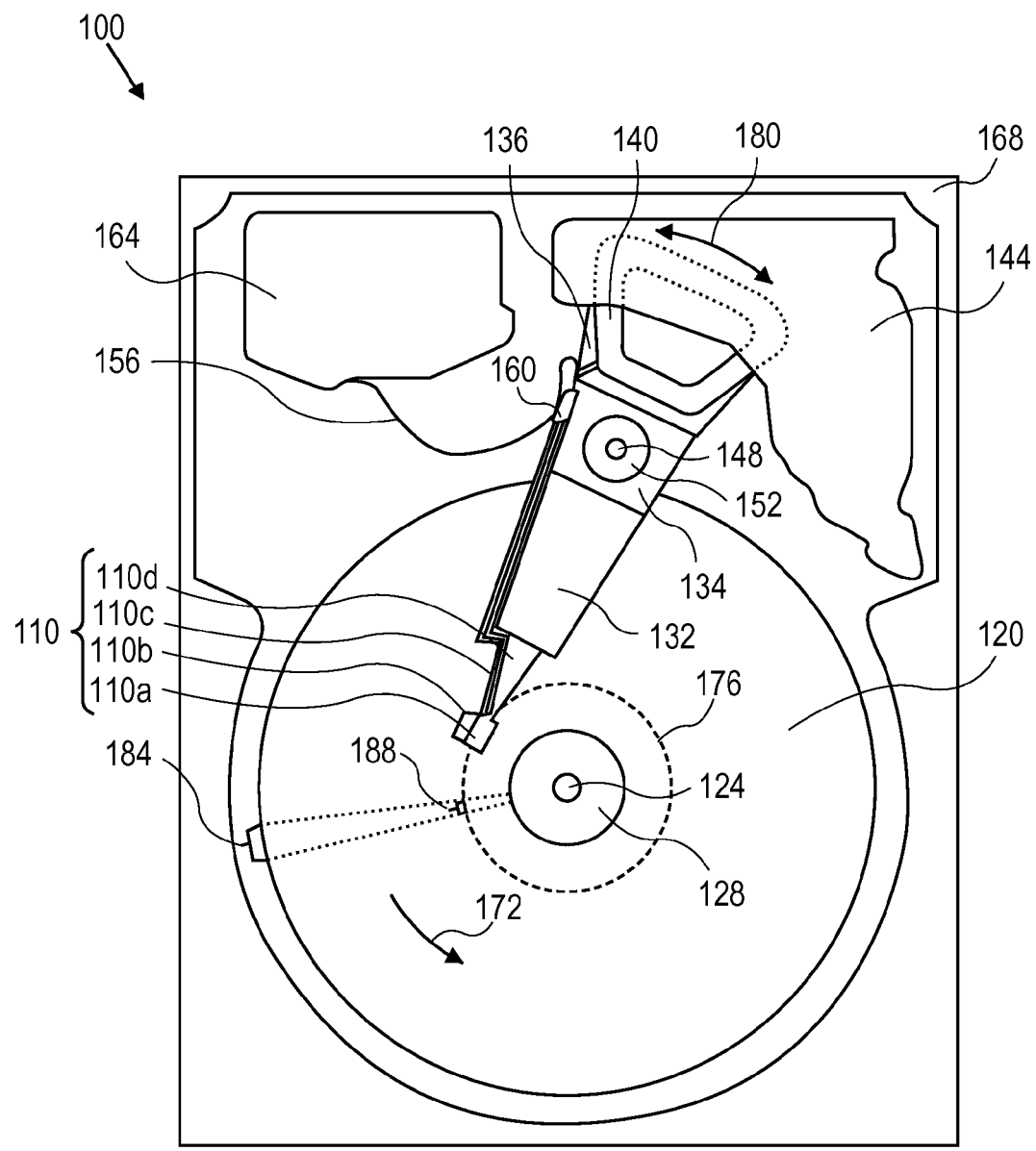
FIG. 1 illustrates a top view and a cross-sectional view of a recessed region of a baseplate according to an embodiment of the invention.

Prior to describing physical and operational characteristics and features of a testing apparatus according to embodiments of the invention, it may be helpful to discuss an illustrative hard-disk drive (HDD), whose cover may be tested by embodiments of the invention. With reference to FIG. 1, a plan view of a HDD 100 is shown. FIG. 1 illustrates the functional arrangement of components of the HDD including a slider 110b including a magnetic-recording head 110a. The HDD 100 includes at least one HGA 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
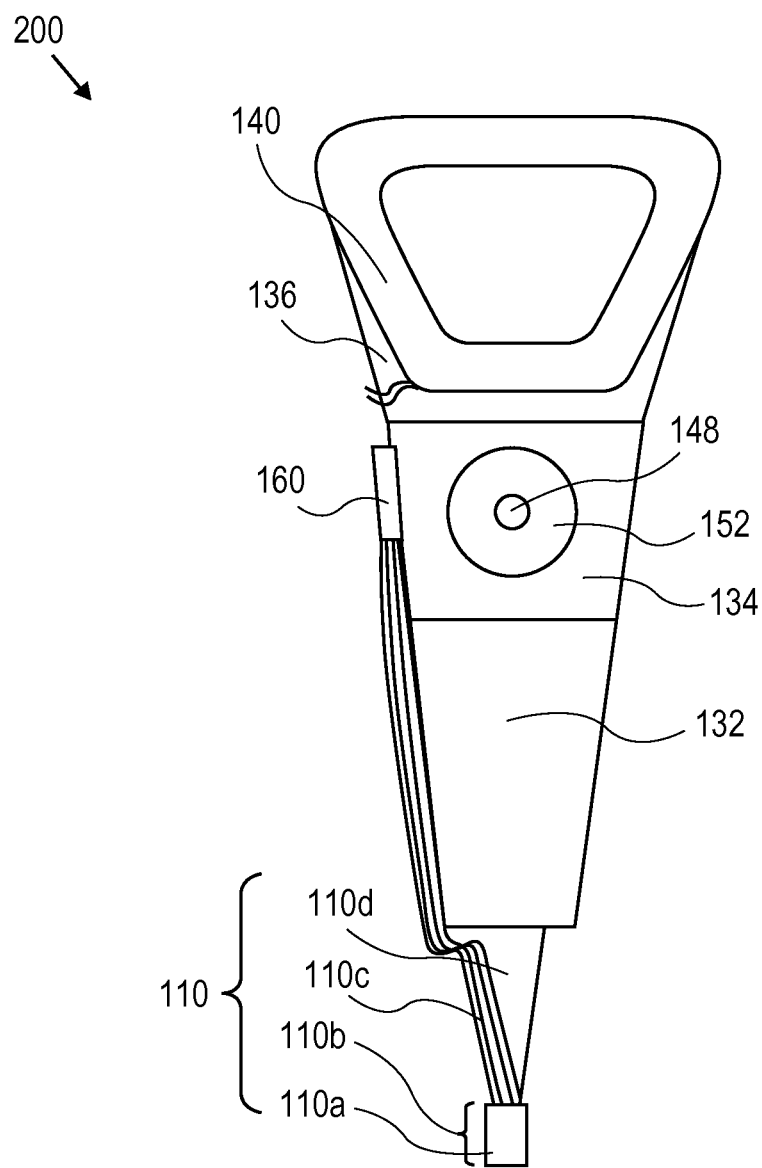
FIG. 2 is a plan view of an HDD according to an embodiment of the invention.

With reference now to FIG. 2, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Physical Description of a Testing Apparatus of an Embodiment

Figure 3:
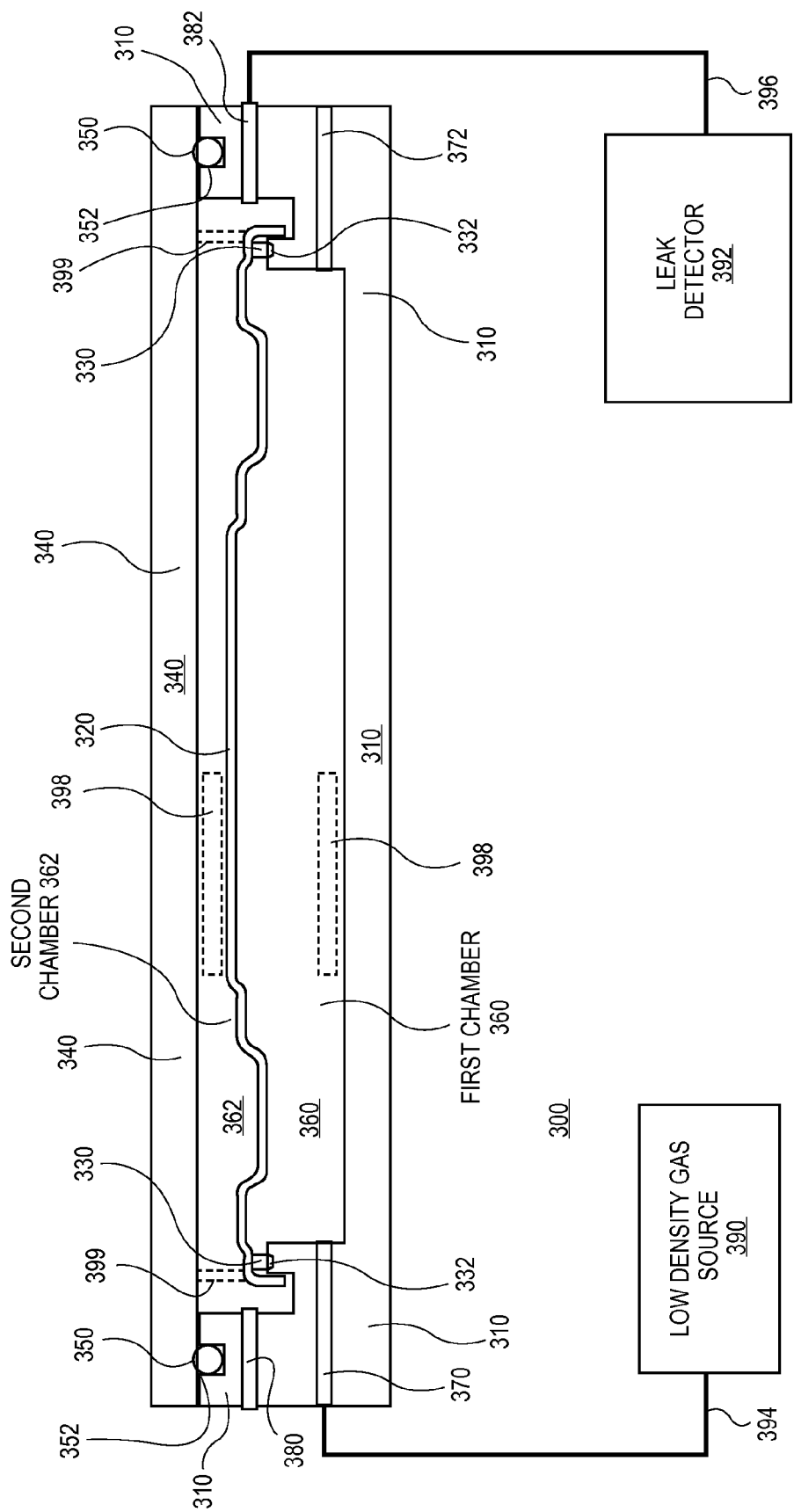
FIG. 3 is an illustration of a testing apparatus according to an embodiment of the invention.

FIG. 3 is an illustration of testing apparatus 300 according to an embodiment of the invention. In the embodiment shown in FIG. 3, testing apparatus 300 includes base structure 310 and removable lid 340. Base structure 310 and removable lid 340 may be composed of any material which is gas-tight and which does not contaminate the cover to be tested or otherwise prevent or frustrate the cover to be subsequently assembled into a hard-disk drive after being tested by testing apparatus 300. Testing apparatus 300 forms a seal around cover 320 in a manner that mimics the actual conditions which cover 320 will experience after assembly. If testing apparatus 300 applied excessive force to cover 320 or applied force to cover 320 in a manner different than the actual conditions that cover 320 will experience after assembly, then the testing apparatus 300 may not accurately discover when a cover being tested is not sufficiently gas-tight.

A cover of a hard-disk drive (HDD) to be tested, such as cover 320, may be disposed within the concave recess of base structure 310 as shown in FIG. 3. Note that when cover 320 is disposed within the concave recess of base structure 310, cover 320 forms first chamber 360 within the concave recess between cover 320 and base structure 310. As shall be discussed in further detail below, many different approaches can be used to seal intentional holes and openings in cover 320 so that first chamber 360 should be gas-tight. Also, when removable lid 340 covers the concave recess of base structure 310 with cover 320 disposed therein, removable lid 340 forms second chamber 362 in the concave recess between cover 320, base structure 310, and removable lid 340.

In an embodiment, base structure 310 may comprise groove 332 having a shape that accommodates the placement of elastomer gasket 330 therein. When cover 320 is disposed within the concave recess of base structure 310 (as shown in FIG. 3), elastomer gasket 330 is positioned between the base structure and the cover when the cover is disposed within the concave recess. Use of elastomer gasket 330 advantageously facilitates a gas-tight seal between cover 320 and base structure 310. Additionally, elastomer gasket 330 may be implemented using an inexpensive part that can be easily replaced. Using elastomer gasket 330 prevents wear to base structure 310 as elastomer gasket 330 receives the large majority of the wear when cover 320 is disposed within the concave recess of base structure 310, thereby extending the serviceable life of base structure 310 as elastomer gasket 330 may be inexpensively replaced as needed.

When elastomer gasket 330 receives sufficient wear such that it no longer provides a gas-tight seal between first chamber 360 and second chamber 362, low density gas (such as helium) introduced into one of the chambers will leak into the other. As a result, a large number of covers being tested by testing apparatus 300 will begin to fail, thereby signaling or indicating that elastomer gasket 330 is no longer in working condition and should be replaced.

As shown in FIG. 3, base structure 310 may also comprise groove 352 having a shape that accommodates the disposition of o-ring 350 therein. When removable lid 340 is positioned to cover the concave recess of base structure 310, o-ring 350 may be used to provide a gas-tight seal between base structure 310, removable lid 340, and cover 320. Using o-ring 350 prevents wear to removable lid 340 as o-ring 350 receives the large majority of the wear when removable lid 340 covers the concave recess of base structure 310, thereby extending the serviceable life of base structure 310 as o-ring 350 may be inexpensively replaced as needed.

In certain embodiments, base structure 310 may, but need not, comprise inflow airway 370 and outflow airway 372. Inflow airway 370 may be used to introduce gas into first chamber 360 using a pump or other such mechanism and outflow airway 372 may be used to remove or take out gas within first chamber 360 using a pump or other such mechanism. Inflow airway 370 may be used in this fashion to introduce a low density gas, such as helium gas, into first chamber 360. As depicted in FIG. 3, inflow airway 370 may be connected to low density gas source 390, which may supply a low density gas, such as helium.

Working together, inflow airway 370 and outflow airway 372 may be used to circulate gas within first chamber 360, as gas removed from the outflow airway 372 may be, at least in part, returned to first chamber 360 via inflow airway 370. Inflow airway 370 and outflow airway 372 may also, as needed, be used to purge gas from the interior of the concave recess of base structure 310 to remove any low density gas, such as helium gas, therefrom. In an embodiment, the amount of gas removed from first chamber 360 via outflow airway 372 may be proportional or equal to the amount of gas introduced into first chamber 360 via inflow airway 370.

In certain embodiments, base structure 310 may comprise inflow airway 380 and outflow airway 382. Inflow airway 380 may be used to introduce gas into second chamber 362 using a pump or other such mechanism and outflow airway 382 may be used to remove or take out gas within second chamber 362 using a pump or other such mechanism. Outflow airway 372 may be used in this fashion to detect how much low density gas, such as helium gas, leaked from first chamber 360 into second chamber 362. As depicted in FIG. 3, outflow airway 372 may be connected to leak detector 392.

Working together, inflow airway 380 and outflow airway 382 may be used to circulate gas within second chamber 362, as gas removed from the outflow airway 382 may be, at least in part, returned to second chamber 362 via inflow airway 380. Inflow airway 380 and outflow airway 382 may also, as needed, be used to purge gas from the interior of the concave recess of base structure 310 to remove any low density gas, such as helium gas, therefrom. In an embodiment, the amount of gas removed from second chamber 362 via outflow airway 382 may be proportional or equal to the amount of gas introduced into second chamber 362 via inflow airway 380.

Using the Testing Apparatus to Evaluate a Cover

Figure 5:
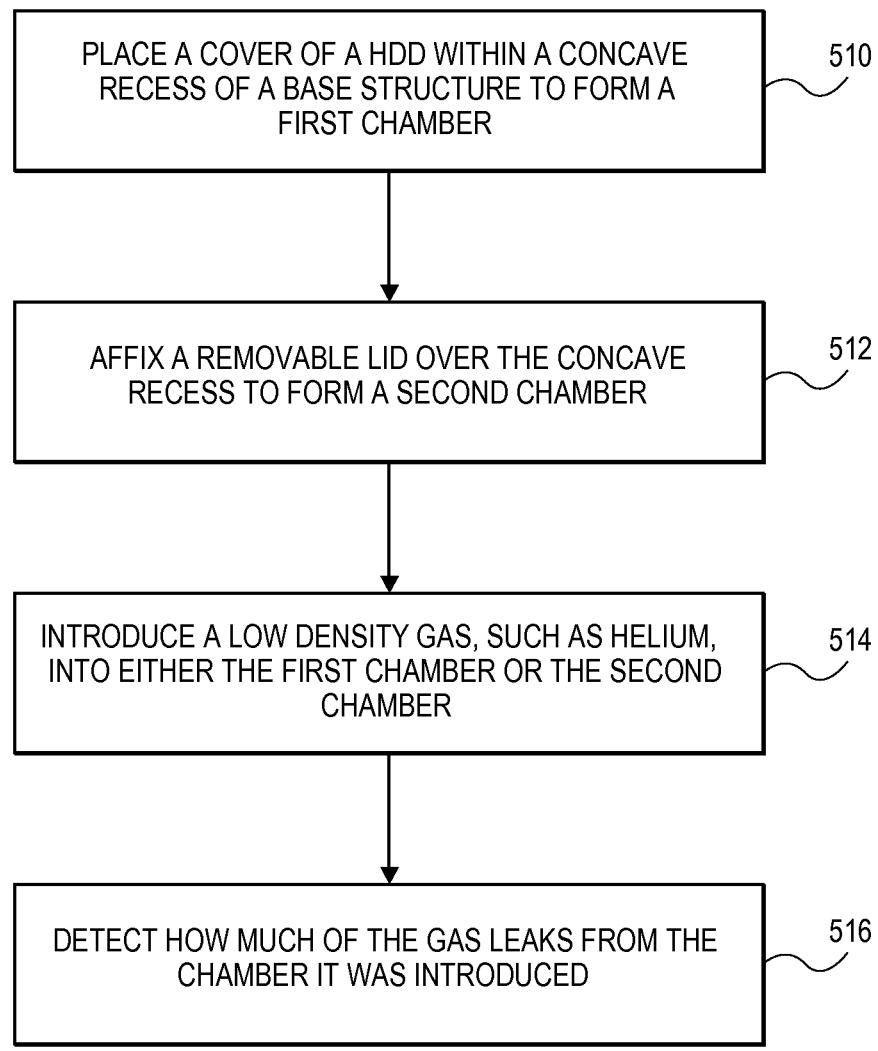
FIG. 5 is a flowchart illustrating the functional steps of testing a cover according to an embodiment of the invention.

FIG. 5 is a flowchart illustrating the functional steps of testing a HDD cover according to an embodiment of the invention. In step 510, cover 320 is placed within the concave recess of base structure 310 to form first chamber 360, as shown in FIG. 3. Elastomer gasket 330 serves to provide a gas-tight seal between base structure 310 and cover 320. It is intended that any low density gas, such as helium, which leaks from first chamber 360 to second chamber 362 will do so through small leaks in cover 320, such as surface induced diffusive leaks (or "SIDIL").

If a cover is sufficiently gas-tight, then the low density gas should not leak into second chamber 362 from first chamber 360 where the low density gas was introduced. Note that cover 320 may have intentional holes and openings, and as shall be explained below, these intentional holes and openings may be sufficiently covered so as to render them gas-tight during the evaluation of cover 320. Once cover 320 is positioned within the concave recess, as shall be described in further detail below, cover 320 is affixed within testing apparatus 300 in a manner that mimics the forces cover 320 will receive after being assembled into a HDD.

In step 512, removable lid 340 is positioned to cover the concave recess to form second chamber 362. O-ring 350 serves to provide an airtight seal between base structure 310, cover 320, and removable lid 340. Therefore, if gas were to leak from first chamber 360, then the only place for the leaking gas to travel would be to second chamber 362.

In step 514, a low density gas, such as helium gas, is introduced into first chamber 360. While certain embodiments may use a variety of different types of low density gas in the performance of step 514, for purposes of providing a clear example, the use of helium gas shall chiefly be described in the performance of step 514. Helium gas diffuses faster than other gases, and so it particularly well suited for use in step 514.

Helium gas may be introduced into first chamber 360 via inflow airway 370 by low density gas source 390. Low density gas source 390 may be implemented using a conventional source calibrated to provide a certain amount of helium gas. Low density gas source 390 may be connected to inflow airway 370 by airway 394. Airway 394 may be implemented using plastic tubing or similar means.

In step 516, the magnitude of any low density gas leak from first chamber 360 to second chamber 360 is determined using leak detector 392. For example, leak detector 392 may be implemented using a conventional mass spectrometer calibrated to detect and quantify the presence of helium gas. Leak detector 392 may sample gas in second chamber 362 using a variety of different methods. For example, leak detector 392 may sample gas within second chamber 362 via outflow airway 382. Leak detector 392 may be connected to outflow airway 382 by airway 396. Airway 396 may be implemented using plastic tubing or similar means.

While embodiments of the invention shall chiefly be described with low density gas, such as helium, introduced into first chamber 360 for purposes of assessing how much low density gas leaks from first chamber 360 into second chamber 362, it is contemplated that embodiments of the invention may introduce the low density gas into second chamber 362 for purposes of how much low density gas leaks from second chamber 362 into first chamber 360. This is so because the propensity for low density gas to leak from one side of cover 320 to the other should be symmetrical under the testing conditions described herein.

Embodiments of the invention enjoy many advantages. The parts within testing apparatus 300 which receive the most wear, namely elastomer gasket 330 and O-ring 350, are inexpensive and easily to replace, thereby extending the working lifespan of testing apparatus 300.

Embodiments of the invention may be performed in an automated fashion. For example, the steps of FIG. 5 may be entirely performed by one or more machines or computer apparatus, without human intervention once the one or more machines or computer apparatus are sufficiently configured. Embodiments of the invention may also evaluate a cover for the presence of leaks far faster than any prior approach, as prior approaches for detecting leaks could not sufficiently detect leaks until after the covers were assembled into the hard-disk drive.

Holding the Cover to be Tested in Place within the Testing Apparatus

In certain embodiments, cover 320 is affixed within testing apparatus 300 in a manner that mimics the forces cover 320 will receive after being assembled into a HDD. Various approaches may be used to achieve this goal. For example, certain embodiments may employ one or more spring loaded pins 399 to hold cover 320 in place within the concave recess of base structure 310. The spring loaded pin 399 may have a high initial displacement relative to their spring constant to allow for small changes in force due to the differences in acceptable tolerances in the physical dimensions of covers.

To illustrate, if the tolerances of the cover allow for as much as 50 μm disparity in the thickness of the cover, then it would be beneficial to have this disparity be accommodated by a small load change. If 100 N is required to hold the cover in place, F=Kx would imply that K*x=100 N. If a spring rate of 1N/μm were chosen, a nominal displacement value would need to be 100 μm. If the cover thickness then moved by its allowable tolerance, the displacement would drop to 50 μm and the spring would only provide half of the required force. However, if a spring rate of 0.01N/μm were chosen, an initial displacement of 10,000 μm (10 mm) would be required to get the necessary force. With this spring rate, if a cover came in at the edge of tolerance, then the displacement would drop to 9950 μm, thereby resulting in 99.5N, which is only a 0.5% drop from the nominal requirement.

In certain embodiments, base structure 310 may comprise pads that provide the same contract geometry as provided by screw bosses on the hard-disk drive in which the cover is to be assembled. This helps provide the approximate sealing forces and cover displacement boundary conditions as would be experienced by the cover after assembly.

Other methods for holding the cover in place include the use of a cantilever carrying each pin, a torsion strong carrying each pin, and various other methods that have been used to perform spring loading.

Various Approaches for Sealing Holes in the Cover

Many different approaches may be used to seal the holes or openings in cover 320 without creating significant forces on cover 320 or otherwise preventing cover 320 from being used without expensive reworking. For example, while stickers or adhesives may be used to cover a hole or opening in cover 320 to seal the hole or opening, such an approach may leave behind adhesive or residue on cover 320 once the sticker or adhesive is removed. As a result, it may be costly to remove such adhesive or residue sufficiently to enable cover 320 may be incorporated into an actual product.

Figure 4:
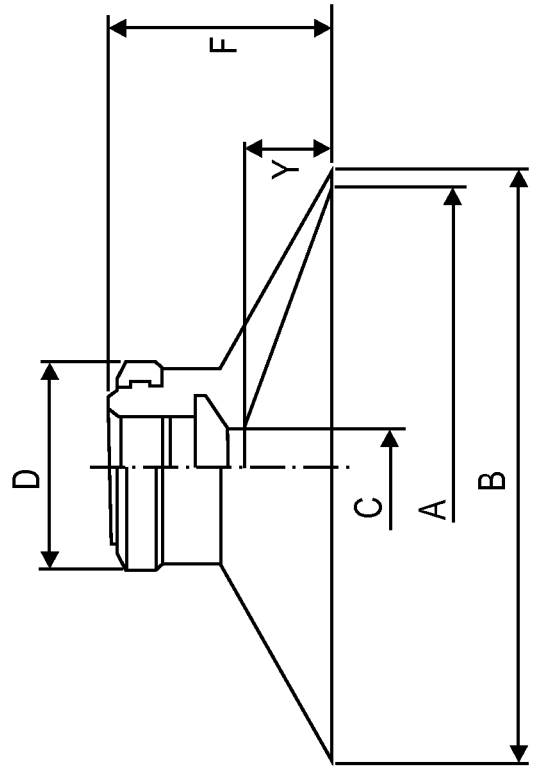
FIG. 4 is a diagram of one approach which may be used to seal holes in a cover according to an embodiment of the invention.
Figure 4:
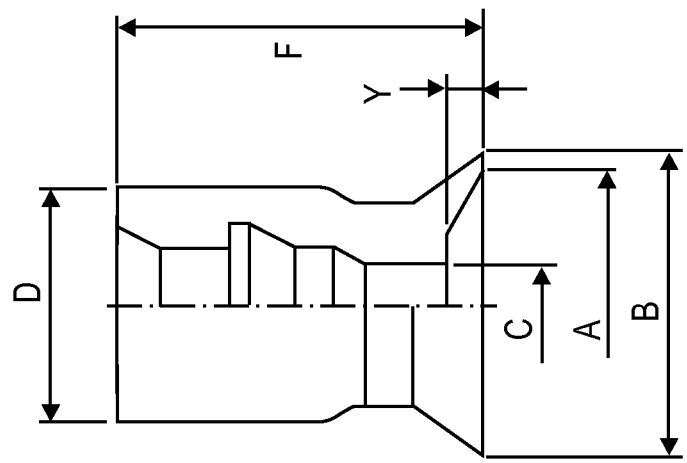

One approach used by certain embodiments for sealing the holes or openings in cover 320 involves the use of a rubber seal having a thin lip. For each hole or opening in cover 320 requiring sealing, one seal is placed on each side of the hole or opening (the hole or opening is labeled D in FIG. 4). An example of such seals is depicted in FIG. 4, which is a cross sectional illustration of one approach which may be used to seal holes in a cover according to an embodiment of the invention. A rubber seal could maintain a seal through deformation from the nominal location. By using one seal (a seal may correspond to Y in FIG. 4) above the hole or opening in cover 320 and one below the hole or opening in cover 320, the resulting force on cover 320 is minimized. Dimensions A and B of the rubber seal are matched to the length of the hole or opening (which is labeled D) requiring sealing. If cover 320 is in the nominal location, then there would be zero net force on cover 320. However, if cover 320 has deformed up or down, the more compressed seal will provide slightly more force to push cover 320 back to the nominal position, but this force will be very small with the involved deflections. Using two seals also reduces the risk of a leak from a seal affecting the measurement.

This approach allows for an off-the-shelf part to be used, which keeps the cost of maintenance down. The seals shown in FIG. 4 may be made from various materials, and are readily replaced when worn. An illustrative material from which these seals may be constructed is fluoroelastomomer, which is known generically as FKM. However, materials such as polyurethane may also be used, assuming appropriate attention paid to transfer of contamination to cover 320. For optimum resistance to the diffusion of helium, butyl rubber or mixtures containing a high portion of butyl rubber may be used.

Embodiments in which testing apparatus 300 is designed to use the rubber seal, such as those depicted in FIG. 4, to provide, without human intervention, a gas-tight seal around intentional holes and openings in cover 320 avoids certain problems introduced by manual labor. An inexperienced human operator may incorrectly apply a seal, which may cause an inadvertent leak. Also, a human operator may not properly remove a seal (or indeed, may forgot or overlook to remove a seal), thereby causing that cover to be different from other covers and to deviate from desired specifications. Also, manually applying seals to intentional holes and openings in a cover adds labor to the cost of the test.

Embodiments of the invention may employ the rubber seals around intentional holes and openings in a cover using manual labor or automated processes and/or machinery. The decision to use manual labor or automated processes and/or machinery to affix the rubber seals is, at least in part, based on economics. It is contemplated by the inventors that many approaches for creating a gas-tight seal around intentional holes and openings in a cover may be used by embodiments, and embodiments are not limited to any particular approach for doing so.

In an embodiment, a rubber seal (corresponding to Y in FIG. 4) may be formed on the end of a rubber shaft (corresponding to F in FIG. 4). The rubber shaft may contain a passageway (having a diameter no greater than C in FIG. 4) through which gas may flow into or out of the first chamber. In this way, gas may be inserted into first chamber 360 through one or more of the seals that seals the intentional holes in cover 320 or gas may be removed from first chamber 360 through one or more of the seals that seals the intentional holes in cover 320. In such an embodiment, it may not be necessary to include inflow airway 370 and outflow airway 372.

The Volume of the Chambers

In certain embodiments, the volume of first chamber 360 should provide a significant enough volume for the test performing by testing apparatus 300 while minimizing the total helium required for the test. In an embodiment, the volume of first chamber 360 may be 15-25% of the volume of the hard-disk drive into which cover 329 is to be assembled. Also, a volume and geometry of first chamber 360 and second chamber 362 should allow for proper air circulation. As depicted in FIG. 3, certain embodiments may employ a fan 398 within first chamber 360 and/or second chamber 362 to circulate gas therein. Other approaches for mixing the gas within first chamber 360 and/or second chamber 362 may also be employed by embodiments, e.g., if the construction or composition of removable lid 340 or base structure 310 permits, gas first chamber 360 and/or second chamber 362 may be mixed using vibrations induced upon testing apparatus 300.

Minimizing the volume of second chamber 362 allows for second chamber 362 to reach equilibrium in less time, which reduces the total time required to test cover 320. The time that second chamber 362 requires to reach equilibrium, in combination with the leak rate of helium though cover 320/elastomeric gasket 330, drives the volume of helium that is required to be present in first chamber 360. To illustrate, if the length of the test to assess cover 320 is long and/or the leak rate is high, then the initial volume of helium in first chamber 360 needs to be high to keep the leak rate stable and provide a reliable result. If the volume chosen is too small, then first chamber 360 will either have a mixture of air due to equimolar counter diffusion or first chamber 360 will have experience a pressure drop due to more helium leaking out than air coming in. Either of these situations will result in a leak rate measured lower than the actual leak rate.

In an embodiment, the volume of first chamber 360 is ideally not larger than the volume of the hard-disk drive in which cover 320 is to be assembled, and the volume of first chamber 360 may be as little as 20% of the volume of the hard-disk drive in which cover 320 is to be assembled. It is noted that too low a volume runs the risk of depleting the helium gas introduced therein before the evaluation of cover 320 is finished, which may result in a false pass (in other words, the presence of a leak within cover 320 sufficient to render it unacceptable for use may go unnoticed). The volume of second chamber 362 is related to the sensitivity of the test, subject to the needs of mixing the gas therein. It is anticipated that the optimum volume within second chamber 362 would not exceed 200% of the volume of the hard-disk drive in which cover 320 is intended to be assembled. The gas within second chamber 362 should be mixed well so that the sampling performed by leak detector 392 is representative of the gas therein.

Various methods may be used to stir the gas within second chamber 362. For example, a circulating flow that enters from a pump at one corner of second chamber 362 and returns to the pump at the opposite corner of second chamber 362 may be used. Naturally, in such an arrangement, the pump should be gas tight.

Illustrative Evaluation of a Cover by an Embodiment

To provide a concrete example of assessing whether a particular cover is sufficiently airtight prior to assembly within a hard-disk drive, an illustrative example shall be discussed. Assume that the volume of a HDD is 25 cc, the volume of first chamber 360 is 10 cc, and the volume of second chamber 362 is 20 cc. Further assume that leak detector 392 is implemented using a properly calibrated mass spectrum based (or similar sensitivity) helium leak detector. Leak detector 392 may sample gas from second chamber 362 in quantities of 1 to 20 cc/min. The quantity of gas sampled in second chamber 362 by leak detector 392 per minute may be determined in accordance with the limits determined by the outflow airway 382 pressure and detection limits. For example, using a specific leak detector, the pressure in outflow airway 382 is around 30 mTorr, and the flow of gas from second chamber 362 through outflow airway 382 is 12 cc/min, and the circulating flow within second chamber 362 is around 1000 cc/min. This example assumes that lower chamber 360 and upper chamber 362 are connected to all needed gas flows.

Removable lid 340 may be removed to expose the interior of the concave recess of base structure 310. Thereafter, the HDD cover to be tested (cover 320 in FIG. 3) is placed within the interior of the concave recess such that elastomeric gasket 350 is disposed between cover 320 and base structure 310 to form a gas-tight seal. Removable lid 340 is then placed over the concave recess of base structure 310 to form second chamber 362.

Force may then be applied to cover 320 and to removable lid 340 to seal first chamber 360 and second chamber 362. Contemporaneous with applying force to cover 320 and removable lid 340, the intentional holes and openings within cover 320 are sealed as described above.

Optionally, second chamber 362 is purged with gas having a low helium or no helium content. First chamber 360 is then filled with helium gas to a sufficient volume to obtain a substantially helium atmosphere. This process may take around 5 to 30 seconds.

Thereafter, second chamber 362 is allowed to reach equilibrium (typically the recalculating flows are used to enable this time to be a minute or less) and the helium leak rate is measured and compared to the specifications.

Covers that meet these specifications (i.e., do not sufficiently leak) may be deemed worthy of being used in a manufactured product, while covers that do not meet these specifications (i.e., do sufficiently leak) may not be used in the assembly of an actual product.

Embodiments of the invention may be used to detect leaks in a wide variety of different types of gaskets. For example, the particular method of curing the gasket of a cover is not relevant to the ability of testing apparatus 300 to detect whether the cover is sufficiently gas-tight. Embodiments of the invention may be used to test covers having gaskets cured using ultra-violet light or temperature, for example. Indeed, embodiments may be used to detect surface defects in covers having gaskets that are cured with an initial ultra-violet light exposure to "set" or "skin" them, followed by a thermal cure.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A testing apparatus for a cover of a hard-disk drive (HDD), comprising:
   a base structure comprising a concave recess shaped to receive the cover, wherein when the cover is disposed within the concave recess, the cover forms a first chamber in the concave recess between the cover and the base structure; and
   a removable lid that covers the concave recess, wherein when the removable lid covers the concave recess with the cover disposed therein, the removable lid forms a second chamber in the concave recess between the cover, the base structure, and the removable lid;
   a means for introducing helium gas to the first chamber, and
   a mass spectrometer means for detecting an amount of helium gas leaking from the first chamber to the second chamber,
   wherein the size of the first chamber is designed to accommodate enough helium gas to perform a surface induced diffusive leakage (SIDIL) test of the cover while minimizing an amount of helium gas required for SIDIL test.

2. The testing apparatus of claim 1, wherein the base structure comprises pads that provide the same contract geometry as provided by screw bosses on the hard-disk drive in which the cover is to be assembled.

3. The testing apparatus of claim 1, wherein the testing apparatus provides, for the cover, approximate sealing forces and cover displacement boundary conditions as would be experienced by the cover after assembly.

4. The testing apparatus of claim 1, wherein the base structure comprises a groove shaped to receive an elastomer gasket that is disposed between the base structure and the cover when the cover is disposed within the concave recess.

5. The testing apparatus of claim 1, wherein the base structure comprises a groove shaped to receive an o-ring that is disposed between the base structure and the removable lid when the removable lid covers the concave recess.

6. The testing apparatus of claim 1, further comprising:
   means for sealing all holes in the cover to prevent any gas from passing therethrough.

7. The testing apparatus of claim 1, further comprising:
   one or more rubber seals each comprising a flexible seal, wherein each flexible seal is one of one or more rubber shafts that are removably affixed over each hole in the cover to prevent any gas from passing therethrough, and wherein the one or more rubber shafts may each be used to test two or more different covers using the testing apparatus.

8. The testing apparatus of claim 1, further comprising:
   one or more rubber shafts each comprising a flexible seal, wherein the flexible seal of one of the one or more rubber shafts is removably affixed over each hole in the cover to prevent any gas from passing therethrough, and wherein the one or more rubber shafts each contain a passageway through which gas may flow into or out of the first chamber.

9. The testing apparatus of claim 1, further comprising:
   means for purging existing gas within the second chamber to cause gas therein to have little to no helium content.

10. The testing apparatus of claim 1, further comprising:
    means for applying a force against the cover at locations and magnitudes as experienced by the cover after assembly.

11. The testing apparatus of claim 1, wherein the cover, when disposed within the concave recess, forms an airtight seal, and wherein the dimensions of the airtight seal correspond to those experienced by the cover after assembly.

12. The testing apparatus of claim 1, wherein the base structure comprises an inflow port for introducing gas into the first chamber, wherein the base structure comprises an outflow port for removing gas from the first chamber, and wherein the inflow port is located opposite the outflow port in the first chamber.

13. The testing apparatus of claim 1, wherein the base structure comprises an inflow port for introducing gas into the second chamber, wherein the base structure comprises an outflow port for removing gas from the second chamber, and wherein the inflow port is located opposite the outflow port in the first chamber.

14. The testing apparatus of claim 1, wherein either the first chamber or the second chamber comprises a fan to circulate gas therein.

15. The testing apparatus of claim 1, wherein the cover is held in place within the concave recess by a plurality of spring loaded pins.

16. The testing apparatus of claim 1, wherein the volume of the first chamber is 15-25% of the volume of the hard-disk drive into which the cover is to be assembled.

17. The testing apparatus of claim 1, wherein the mass spectrometer means analyzes the gas within the second chamber by sampling the gas within the second chamber via a tube coupled to the second chamber and the mass spectrometer means.

18. A testing apparatus for a cover of a hard-disk drive (HDD), comprising:
    a base structure comprising a concave recess shaped to receive the cover, wherein when the cover is disposed within the concave recess, the cover forms a first chamber in the concave recess between the cover and the base structure; and
    a removable lid that covers the concave recess, wherein when the removable lid covers the concave recess with the cover disposed therein, the removable lid forms a second chamber in the concave recess between the cover, the base structure, and the removable lid;
    a means for introducing a low density gas to one of the first chamber and the second chamber, and
    a mass spectrometer means for detecting an amount of the low density gas leaking from the one of the first chamber and the second chamber to the other of the first chamber and the second chamber, wherein the size of the first chamber is designed to accommodate enough helium gas to perform a surface induced diffusive leakage (SIDIL) test of the cover while minimizing an amount of helium gas required for the SIDIL test.

19. A method for detecting leaks within a cover of a hard-disk drive (HDD), comprising:

disposing the cover within a concave recess of a base structure, wherein the concave recess is shaped to receive the cover, wherein when the cover is disposed within the concave recess, the cover forms a first chamber in the concave recess between the cover and the base structure;

affixing a removable lid to cover the concave recess, wherein when the removable lid covers the concave recess with the cover disposed therein, the removable lid forms a second chamber in the concave recess between the cover, the base structure, and the removable lid;

introducing a low density gas to one of the first chamber and the second chamber; and detecting how much of the low density gas leaks from the one of the first chamber and the second chamber to the other of the first chamber and the second chamber, wherein the size of the first chamber is designed to accommodate enough helium gas to perform a surface induced diffusive leakage (SIDIL) test of the cover while minimizing an amount of helium gas required for the SIDIL test.

20. A testing apparatus for a cover of a hard-disk drive (HDD), comprising:

a base structure comprising a concave recess shaped to receive the cover, wherein when the cover is disposed within the concave recess, the cover forms a first chamber in the concave recess between the cover and the base structure; and a removable lid that covers the concave recess, wherein when the removable lid covers the concave recess with the cover disposed therein, the removable lid forms a second chamber in the concave recess between the cover, the base structure, and the removable lid;

a means for introducing helium gas to the first chamber, a mass spectrometer means for detecting an amount of helium gas leaking from the first chamber to the second chamber; and means for purging existing gas within the second chamber to cause gas therein to have little to no helium content.

* * * * *